United States Patent [19]
Ledet

[11] Patent Number: 5,156,263
[45] Date of Patent: Oct. 20, 1992

[54] MODULAR CONVEYOR BELT SEALED SPROCKET DRIVE SYSTEM

[75] Inventor: Brent A. Ledet, Kenner, La.

[73] Assignee: The Laitram Corporation, New Orleans, La.

[21] Appl. No.: 815,030

[22] Filed: Dec. 31, 1991

[51] Int. Cl.$^5$ ............................................. B65G 23/06
[52] U.S. Cl. .................................................. 198/834
[58] Field of Search ................ 198/834; 474/156, 157, 474/161, 164

[56] References Cited

U.S. PATENT DOCUMENTS

| | | |
|---|---|---|
| 3,064,797 | 11/1962 | Besel et al. |
| 3,724,285 | 4/1973 | Lapeyre ............... 198/834 |
| 4,082,180 | 4/1978 | Chung. |
| 4,730,724 | 3/1988 | Poerink ............... 198/834 |

Primary Examiner—Joseph E. Valenza
Attorney, Agent, or Firm—Laurence R. Brown; James T. Cronvich

[57] ABSTRACT

A sprocket tooth modular link conveyor belt drive mechanism is provided for use in chemical and food environments where it is important to control contaminants and bacteria. Thus an easy to clean and sanitize modular assembly devoid of dirt and grime catching structure in the vicinity of the conveyor belt is provided. A further feature is the safety of operation, by encompassing moving belt drive equipment in a closed modular compartment shielded from the possibility of accidental damage to conveyor loads, or serivce and operating personnel. These improvements are achieved in a belt drive mechanism module with an enclosed hermetically sealed drive system operable from an internally disposed electric drive motor with associated drive gear train. An external rotatable hollow drum member carries the sprocket teeth and has a smooth outside easy to clean surface without a propensity to accumulate dirt or grime or leak lubricating oil, or to present operating hazards to operators and service personnel. Further significant advantages are presented in assembling a variety of sprocket tooth drive configurations which can accommodate lateral dynamic belt movements in operation and different sprocket tooth configurations matching various belt module configurations.

19 Claims, 1 Drawing Sheet

MODULAR CONVEYOR BELT SEALED SPROCKET DRIVE SYSTEM

TECHNICAL FIELD

This invention relates to modular link conveyor belt systems and more particularly it relates to sprocket drive mechanisms therefor.

BACKGROUND

Plastic modular link conveyor belts are ideally suited for processing foods, chemicals and other critical products that must be protected from environmental contamination, such as bacteria, oil or accumulated dust, dirt and grime. In such environments the belt and belt drive systems need to be sanitized or cleaned frequently, and this is difficult and possibly dangerous when the drive system is located inaccessibly. Also, conventional drive systems using sprocket teeth often employ rough surfaces, crevices and corners tending to accumulate contaminants. In such environmental operating conditions, it has been difficult with prior art systems to meet the critical requirements for cleanliness and sanitation because of the presence of sprocket drive teeth and accompanying drive mechanisms in modular link belt drive systems. Consider that because of the mechanical requirements to bear loads and to rotate for long times sprocket gear teeth and accompanying drive mechanisms require lubrication, which encourages vapors and grime inconsistent with sanitation and lack of contamination. Thus, it is a significant problem when contaminants are present, even in trace quantities and where sprockets and drive systems take configurations that tend to breed pockets of contaminants and which are very difficult to reach and clean.

Furthermore sprocket drive systems often employ mechanisms which are subject to excessive wear in the environment of modular link belt operations, where abrasive residue from the belt can significantly shorten operating life.

Additionally safety to operating and service personnel is a problem. However, conventional prior art sprocket drive mechanisms for conveyor belts have drive gears, pulleys and like mechanisms which may not be adequately protected from the possibility of encounter with clothing, tools, loads or even personal body parts such as hands which can be damaged or eyes into which damaging materials could be thrown.

It is therefore an objective of this invention to provide improved sprocket drive systems in modular conveyor belt systems which produce less contamination and which are more readily cleaned and sanitized.

Another object of the invention is to provide sprocket drive systems with longer operating life.

Still another object is to provide sprocket drive systems with improved safety to operating and service personnel.

Other objects, features and objectives of the invention will be found throughout the following description, drawings and claims.

DISCLOSURE OF THE INVENTION

Substantially all the operating hazards dangerous to personnel are eliminated from the belt drive mechanisms as well as the propensity to accumulate or spread contaminants such as bacteria grease or grime. Thus by closing and sealing in the sprocket drive system mechanism, a conveyor belt system is made more acceptable for environmental control in processing food or chemical products.

Also, operating conditions are improved by compactness of the drive mechanisms into a modular element in accordance with this invention. This reduces friction and packing space, and expedites servicing with simple modular replacement of drive mechanisms with compact modules.

The drive modules are made substantially universal in character by accommodation of various belt sprocket configurations with easily accessible and replaceable sprocket discs. The discs are light weight, thereby reducing power and inertia for better operating conditions, yet sturdy and strong in their assigned duty of driving loaded belts. The discs are further capable of accommodating dynamic stresses of loaded belts under various environmental conditions including curved paths, radical temperature changes and unbalanced loading, by means of free lateral movement transverse to the belt if desired.

All these advantages are achieved by mounting sprocket teeth upon a hollow rotating member internally housing the driving mechanism, typically a substantially cylindrical hermetically sealed drum, which is typically driven by an internally disposed electric motor and drive gear train. The drum when hermetically sealed prevents leakage of oil, vapor or worn off residue into the atmosphere. Likewise it eliminates dirt, dust and abrasives from the drive mechanism thus providing longer life expectations.

The sprocket teeth are preferably formed on light weight hollow disc like rings mated on the outer rotating drum peripheral surface of the driving module and keyed for rotation with the drum. Shaped drum surfaces, preferably octagonally sculptured, advantageously drive and key the rings for location along the drum axis to mesh with belt drive apertures individually or in sets. Discs are readily provided and positioned to conform to the sprocket drive spacings and teeth configurations for a variety of different belts. The sprocket rings are mountable with at least a degree of free axial movement to accommodate dynamic belt conditions encountered from unbalanced loading, movement around curves and significant temperature changes, thereby increasing belt life and reliability.

Other features and advantages will be evident from the following text.

BRIEF DESCRIPTION OF THE DRAWINGS

In the accompanying drawings, wherein like features are given similar reference characters in the several views to facilitate comparison.

THE PREFERRED EMBODIMENTS

Figure 1:
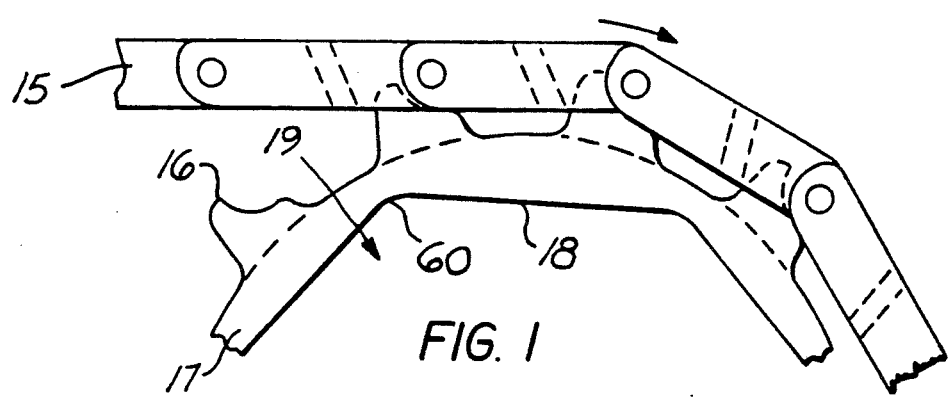
FIG. 1 is a fragmental side view sketch of a modular link conveyor belt sprocket drive system wherein the belt is conveyed by sprocket teeth in the direction of the arrow.

With respect to FIG. 1, it is seen that modular link conveyor belt 15 is driven toward the right by means of sprocket teeth 16 in the rotatable sprocket wheel 17, which may be in the form of a drum, disc or series of spaced discs. This sprocket wheel 17 is keyed on a drive shaft by a non-circular and preferably symmetrical central bore 19, in this embodiment defined as an octagon with flat planar sides 18.

Figure 2:
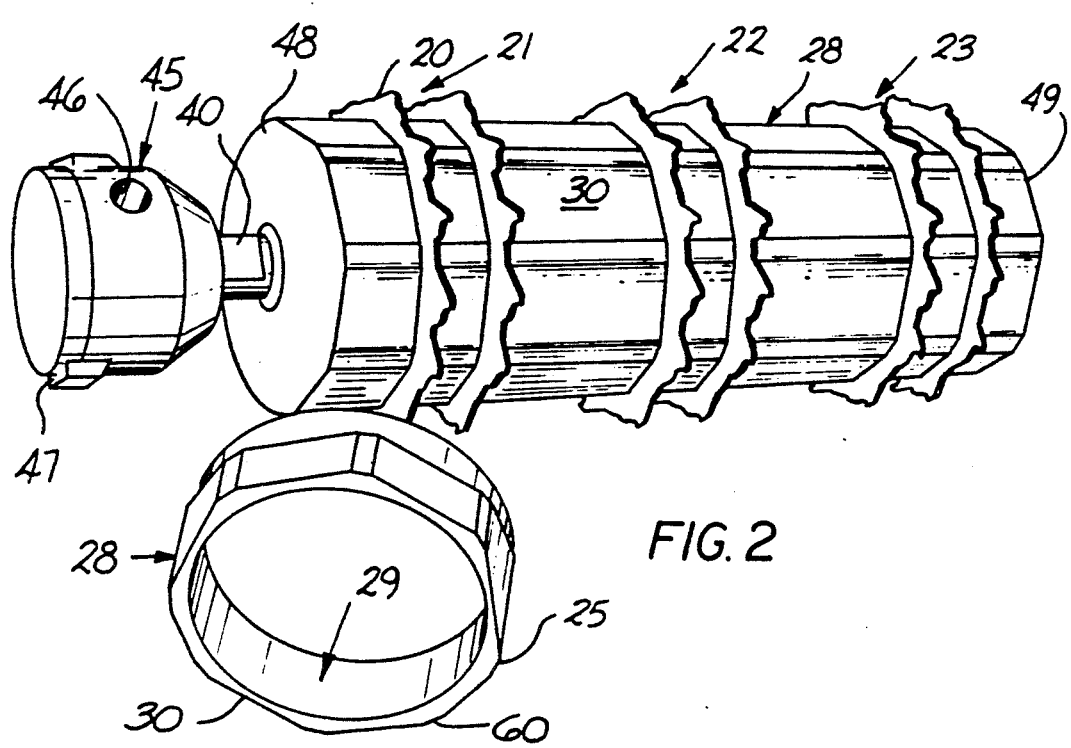
FIG. 2 is a side perspective view of a modular belt sprocket drive mechanism embodiment of the invention, with comparative fragmental cutaway segment emphasizing construction details of the hollow outer drum used in accordance with this invention to carry the sprocket teeth.

As seen in FIG. 2, a series of sprocket discs 20 are arranged in paired sets 21, 22, 23 axially along the outer peripheral surface 25 of a hollow body member 28 in the form of a substantially cylindrical pipe 29 with a smooth cylindrical interior surface in this embodiment. The outer peripheral surface has eight flattened surfaces 30 arranged in octagon configuration for mating with octagon shaped aperture surfaces 18 of the individual sprocket discs 20.

Figure 3:
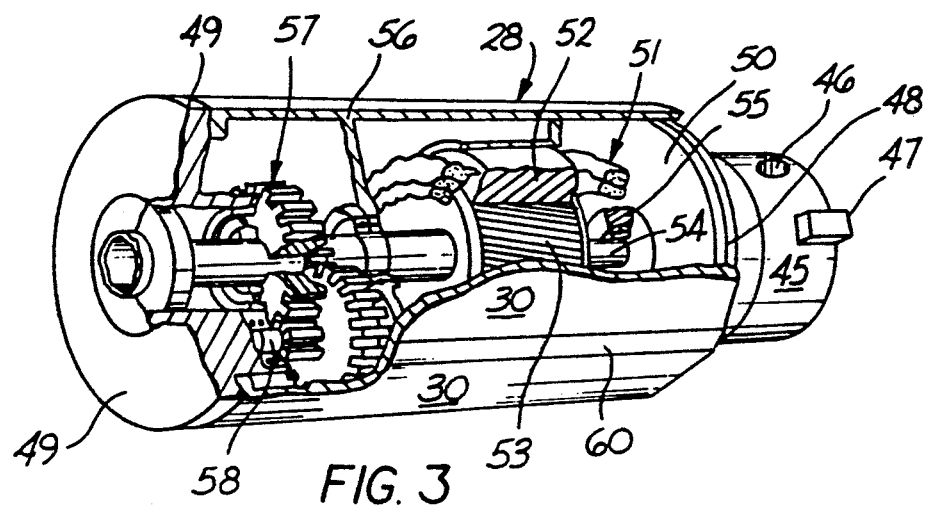
FIG. 3 is a perspective, cut away sketch of a typical motor drive embodiment afforded by this invention.

The discs 20 and disc sets 21, etc. may have sprocket tooth shapes and spacings to mate with various modular belt configurations of various widths. The outer hollow body member 28 as shown in both FIGS. 2 and 3 is rotatable coaxially about a supporting shaft 40, which is anchored to a suitable frame, thus making the externally disposed stationary service compartment 45 accessible for receiving lubricating fluid at port 46 and electrical connections at terminals 47. The hollow member 28 has end plates 48, 49 to form an enclosed drum assembly capable of hermetic sealing to prevent dust and grime or conveyor belt residue from entering into the interior, and for preventing internal grease, grit or vapors from entering the environment in which the conveyor belt is working.

In the drum interior 50, as shown in FIG. 3, is mounted the conveyor belt electrical drive motor 51, having the conventional stator member 52 mounted on the stationary inner wall 56 and the conventional armature 53 mounted on the rotatable shaft 54 journalled for rotation in bearing 55. Thus, the motor drives the planetary gear train 57 having individual gears journalled in bearings 58, etc. thereby to rotate the drum end panel 49 and thus the outer hollow drum cylindrical member 28. Variations from this particular electrical motor driven mechanism can be made without departing from this invention. Alternative forms of such mechanisms are known in the art, such as shown in Chung U.S. Pat. No. 4,082,180, Apr. 4, 1978 and Besel, et al. U. S. Pat. No. 3,064,797, Nov. 20, 1962. Also, more than eight sides, say 20 are possible, especially for large diameter sprockets.

Although fewer drum sides 30 could be used, the octagonal configuration including the rounded corners 60 has significant advantage in that the peak to valley ratio of wall thickness is reduced and a thinner, lighter shell is rotatable with less energy. The even number of surfaces is thus symmetrically disposed for good balance. However, if it is desirable to radially key the sprocket discs 20 in a particular position, one such surface (18, 30) may be made asymmetrical by being shorter, longer, or shallower, etc. The thin walls also provide a better dissipation of internal heat from the drive mechanism, which can also be aided by internal lubricant-cooling fluids supplied and monitored at the port 46.

It is evident that the mechanism is easily cleaned and sanitized in the absence of any rough surfaces, crevices and corners that tend to accumulate dirt, grease or grime. The sprocket discs, particularly when freely axially movable can also be easily moved or removed from the drum for cleansing and sanitation. A preferable drum surface material would be anodized aluminum, since it is light weight and non-corrosive, or stainless.

Having therefore advanced the state of the art with improved sprocket drive systems for modular conveyor belts, those novel features setting forth the spirit and nature of the invention are set forth with particularity in the following claims.

I claim:

1. In a modular conveyor belt system having modular belt links driven by sprocket teeth, an electric sprocket drive motor disposed within a rotary drum with a mechanism for rotating the drum with the motor, and a sprocket tooth assembly removably keyed by means of mating non-round surfaces on the drum and the sprocket tooth assembly on the rotary drum for rotation therewith to engage and drive the conveyor belt.

2. The belt system of claim 1 wherein the drum is sealed with motor and mechanism inside to protect the belt system from contaminants.

3. The belt system of claim 1 wherein the drum has a substantially cylindrical outer surface modified to define a configuration for keying thereon to rotate with the drum at least one substantially circular collar member carrying sprocket teeth.

4. The belt system of claim 3 wherein the circular collar members comprise discs adapted to freely move at least a limited distance axially along the drum surface to follow dynamic position changes encountered in the belt under operating conditions.

5. The belt system of claim 3 wherein the configuration comprises a multiplicity of substantially planar surfaces axially disposed along the substantially cylindrical outer surface.

6. The belt system of claim 5 wherein the configuration has an even number of said planar surfaces.

7. The belt system of claim 6 with one of the planar surfaces configured asymmetrically with the other planar surfaces to produce keying structure for orienting the sprocket discs in a particular radial position.

8. The belt system of claim 5 with eight said planar surfaces.

9. In an endless conveyor belt system, the combination comprising,
 a modular link belt having drive apertures periodically presented to receive sprocket teeth from rotating sprocket drive means, and
 rotatable sprocket drive means presenting sprocket drive teeth in mating registration with said apertures to drive the belt, further comprising:
 a rotatably mounted hollow drum configured to retain sprocket tooth carrying means thereon positionable axially at various positions along the drum and keyed by mating non-round surfaces on the drum and tooth carrying means,
 a drive motor mounted internally in said hollow drum, and
 drum rotating means for rotating said drum with said motor to drive said belt in response to energization of said motor.

10. The system of claim 9 further comprising a multilaterally surfaced outer drum periphery, and a plurality of sprocket tooth rings mating with said periphery in axially spaced relationships axially along the drum.

11. The system of claim 10 further comprising means permitting the rings to freely move at least a limited distance axially along the drum when engaged to drive said belt thereby to conform with dynamic lateral belt movements across the drum in the presence of loading and temperature forces.

12. A driver mechanism for a modular link conveyor belt, comprising in combination,
    a hollow member disposed along an axis for disposal transversely across said belt in a driving relationship with the belt,
    a driving motor confined within said hollow member,
    a shaft engaging, supporting and extending from said hollow member for supporting the member alongside the conveyor belt,
    driving means coupling the motor to the hollow member for rotation about said shaft,
    a tooth assembly surrounding the hollow member, and
    keying means constituting mating non-round surface configurations on the hollow member and tooth assembly for rotating sprocket drive teeth by means of the hollow member to drive said belt.

13. The mechanism of claim 12 further comprising means for sealing the hollow member into a body isolating the motor and gearing from the environment, thereby to prevent residue from operation of the motor and gearing from leaving the body during belt operation.

14. The mechanism of claim 12 wherein the tooth assembly further comprises a plurality of sprocket rings dispersed axially along the hollow member.

15. The mechanism of claim 14 wherein the hollow member is configured to have an outer peripheral surface of a predetermined multilateral shape, and said sprocket rings have a central aperture of corresponding multilateral shape for mating on the hollow member in a belt driving relationship.

16. The mechanism of claim 12 wherein the hollow member further comprises a generally cylindrical member with a plurality of axially oriented substantially planar surfaces disposed about an outer periphery of the hollow member.

17. The mechanism of claim 16 wherein the periphery of said member is substantially octagonal in shape.

18. The mechanism of claim 16 wherein the plurality of planar surfaces is even numbered.

19. The mechanism of claim 18 wherein the tooth assembly comprises at least one ring member movable axially along the outer periphery of the hollow member, and wherein one of said plurality of planar surfaces is asymmetrically configured to provide keying means for orienting the at least one ring member into a keyed relationship with the hollow member.

* * * * *